(12) United States Patent
Murdoch

(10) Patent No.: US 10,344,790 B2
(45) Date of Patent: Jul. 9, 2019

(54) MASONRY ANCHOR OF THE EXPANSION TYPE

(71) Applicant: Illinois Tool Works Inc., Glenview, IL (US)

(72) Inventor: Thomas Murdoch, Warooka (AU)

(73) Assignee: Illinois Tool Works Inc., Glenview, IL (US)

( * ) Notice: Subject to any disclaimer, the term of this patent is extended or adjusted under 35 U.S.C. 154(b) by 59 days.

(21) Appl. No.: 15/434,351

(22) Filed: Feb. 16, 2017

(65) Prior Publication Data

US 2017/0241458 A1 Aug. 24, 2017

(30) Foreign Application Priority Data

Feb. 18, 2016 (AU) ................................ 2016900579
Feb. 15, 2017 (AU) ................................ 2017201013

(51) Int. Cl.
*F16B 13/06* (2006.01)
(52) U.S. Cl.
CPC ............ *F16B 13/065* (2013.01); *F16B 13/06* (2013.01)
(58) Field of Classification Search
CPC ...... F16B 13/06; F16B 13/065; F16B 13/066; F16B 13/124; F16B 37/12
USPC ............. 411/15, 16, 17, 55, 60.2, 80.1, 80.6
See application file for complete search history.

(56) References Cited

U.S. PATENT DOCUMENTS

| | | | |
|---|---|---|---|
| 961,583 A * | 6/1910 | Clements | F16B 13/124 411/63 |
| 2,259,269 A * | 10/1941 | Ruth | F16B 13/066 411/68 |
| 2,463,859 A * | 3/1949 | Engstrom | F16B 39/023 411/17 |
| 2,950,576 A | 8/1960 | Rubenstein | |
| 3,256,661 A * | 6/1966 | Fischer | E04F 13/0853 52/373 |
| 3,404,503 A | 10/1968 | Courtois | |

(Continued)

FOREIGN PATENT DOCUMENTS

| AU | 20040203247 | 2/2005 |
|---|---|---|
| DE | 1291300 | 3/1969 |

(Continued)

OTHER PUBLICATIONS

Extended European Search Report for European Application No. 17156533.6, dated Jun. 9, 2017 (5 pages).

*Primary Examiner* — Roberta S Delisle
(74) *Attorney, Agent, or Firm* — Neal, Gerber & Eisenber LLP

(57) ABSTRACT

Various embodiments of the present disclosure provide a masonry member comprising an anchor member and a sleeve. The anchor member has a shank with a ridge formed thereon, the ridge extending radially outwardly from and along a surface of the shank generally from a distal end of the anchor member toward a head of the anchor member. The sleeve defines a groove. The sleeve is coaxial with and at least partially surrounds the anchor member such that the ridge of the shank is at least partially received in the groove. A cross-sectional width of at least one of the ridge and the groove reduces in a direction extending toward the head of the anchor member so withdrawal of the anchor member through the sleeve expands at least part of the sleeve radially outwardly.

9 Claims, 16 Drawing Sheets

(56) References Cited

U.S. PATENT DOCUMENTS

| | | | |
|---|---|---|---|
| 3,566,947 A * | 3/1971 | Jukes | F16B 37/122 |
| | | | 29/523 |
| 3,848,506 A * | 11/1974 | Zifferer | F16B 13/124 |
| | | | 411/17 |
| 4,290,638 A | 9/1981 | Manning | |
| 4,483,121 A | 11/1984 | Froening et al. | |
| 4,652,193 A | 3/1987 | Hibbs | |
| 5,116,176 A | 5/1992 | Yousuke | |
| 5,655,864 A * | 8/1997 | Haage | B22F 3/225 |
| | | | 403/206 |
| 5,816,759 A | 10/1998 | Ernst et al. | |
| 5,957,646 A * | 9/1999 | Giannuzzi | F16B 25/00 |
| | | | 411/311 |
| 6,457,895 B1 | 10/2002 | Salman | |
| 6,712,573 B1 * | 3/2004 | Huber | F16B 12/14 |
| | | | 403/282 |
| 7,445,251 B2 | 11/2008 | Nilsen et al. | |
| 8,505,856 B2 | 8/2013 | Panasik et al. | |
| 2002/0070322 A1 | 6/2002 | Zambelli et al. | |
| 2003/0208969 A1 | 11/2003 | Lancelot, III et al. | |
| 2014/0260067 A1 | 9/2014 | Pryor | |

FOREIGN PATENT DOCUMENTS

| | | |
|---|---|---|
| DE | 19653985 | 6/1998 |
| DE | 10 2013 206 387 | 10/2014 |
| EP | 2 309 138 | 4/2011 |
| GB | 313787 | 6/1929 |
| JP | 5559926 | 6/2014 |

* cited by examiner

Section A-A

Section B-B

Section A-A

Section B-B

MASONRY ANCHOR OF THE EXPANSION TYPE

PRIORITY CLAIM

This patent application claims priority to and the benefit of Australian Patent Application No. 2017201013, which was filed on Feb. 15, 2017, which claims priority to and the benefit of Australian Patent Application No. 2016900579, which was filed on Feb. 18, 2016, the entire contents of each of which are incorporated herein by reference.

FIELD

The present disclosure relates to a masonry anchor of the expansion type.

BACKGROUND

Masonry anchors of the expansion type have been known for many years and their limitations are well known. In particular, many known anchors engage a retention hole at a point, causing a stress concentration and a suboptimal load pattern during loading that can lead to failure. It is desirable to provide a masonry anchor having improved retention characteristics.

Examples of the present disclosure seek to solve, or at least ameliorate, one or more disadvantages of previous masonry anchors.

SUMMARY

According to the present disclosure, there is provided a masonry anchor of the expansion type comprising:
- an anchor member having an elongate shank with at least one ridge formed thereon, the ridge extending radially outwardly from and along a surface of the shank generally from a distal end of the anchor member toward a head of the anchor member; and
- a sleeve coaxial with and at least partially surrounding the anchor member, wherein at least a portion of the sleeve is configured to expand radially outwardly for engagement with an internal surface of the hole, the sleeve having at least one groove formed therein and the or each groove configured for receiving a corresponding ridge of the anchor member,
- wherein a cross-sectional width of the or each ridge and/or a cross-sectional width of the or each groove reduces as the ridge/groove extends toward the head so that as the shank is withdrawn through the sleeve, the or each ridge urges a corresponding groove radially outwardly to bring the sleeve into contact with the hole to secure the anchor within the hole to bring the sleeve into contact with the hole secure the anchor within the hole.

According to one embodiment of the present disclosure, both a cross-sectional width of the ridge and a cross-sectional width of the groove reduces toward the head.

The groove may extend through an outer surface of the sleeve. In certain embodiments, an intersection of the groove and an external surface of the sleeve forms an edge with a profile configured for cutting into the concrete as the sleeve expands.

According to some embodiments, three ridge and groove pairs and the ridge is wrapped around the shank to form a spiral.

In another embodiment, the or each ridge is formed on a portion of the shank proximal the end and a portion of the sleeve intermediate a termination of the ridge(s) and the head is configured to extend outwardly to secure the anchor within a void.

According to the present disclosure, there is also provided a masonry anchor of the expansion type comprising:
- an anchor member having an elongate shank with a plurality of helical ridges formed thereon, the ridges extending radially outwardly from and along a surface of the shank generally from a distal end of the anchor member toward a head of the anchor member; and
- a sleeve member having a plurality of helical fingers configured to extend around the anchor member in a space between the ridges, the helical fingers defining between adjacent fingers a plurality of helical voids, each void being configured for receiving a corresponding ridge of the anchor member,
- wherein a cross-sectional width of the ridges and a cross-sectional width of the helical voids reduce toward the head so that as the anchor member is withdrawn through the sleeve member, contact between the ridges and the fingers causes the fingers to be urged radially outwardly to bring the fingers into contact with an internal surface of a hole to secure the anchor within the hole.

The ridges can be formed on a portion of the shank proximal the end and a portion of the sleeve member intermediate a termination of the ridges is configured to extend outwardly to secure the anchor within a void.

According to embodiments of the present disclosure, the head is configured to receive a fastener for fixing an item to the surface in which the hole is formed. The head can be formed with a socket in which the fastener can be received, the head being configured for releasable engagement with the fastener.

According to the present disclosure, there is also provided a sleeve for an masonry anchor, the sleeve being configured to be coaxial with and at least partially surround a shank of the anchor, wherein at least a portion of the sleeve is configured to expand radially for securing the anchor in a hole, the sleeve having at least one groove formed in an internal surface and configured for receiving a corresponding ridge of the shank.

In various embodiments, a cross-sectional width of the groove reduces as the groove extends toward a head of the anchor so that as the shank is withdrawn through the sleeve, the sleeve expands to secure the anchor within the hole. The sleeve can be configured to be cast into wet concrete.

According to the present disclosure, there is also provided an anchor member for an masonry anchor, the bolt having an elongate shank with at least one ridge formed thereon, the ridge extending radially outwardly from and along a surface of the shank generally from a end of the anchor toward a head of the anchor, the or each ridge being configured to be received by a corresponding groove formed in a sleeve which, in use, at least partially surrounds the shank.

In certain embodiments, a cross-sectional width of the ridge reduces as the ridge extends toward the head so that as the shank is withdrawn through the sleeve, the sleeve expands to secure the anchor within the hole.

According to the present disclosure, there is also provided a method of securing an masonry anchor in a hole including the steps of:
- providing an anchor member having an elongate shank with at least one ridge formed thereon, the ridge extending radially outwardly from and along a surface of the shank generally from a end of the anchor toward a head of the anchor;

providing a sleeve configured to be coaxial with and at least partially surround a shank of the anchor and configured to expand radially for securing the anchor in a hole, the sleeve having at least one groove formed in an internal surface thereof and configured for receiving a corresponding ridge of the shank, wherein a cross-sectional width of the ridge and/or a cross-sectional width of the groove reduces as the ridge/groove extends toward the head so that as the shank is withdrawn through the sleeve, the sleeve expands; and withdrawing the anchor member while maintaining the sleeve substantially in position to lock the anchor within the hole.

In various embodiments, the masonry anchor has three ridge and groove pairs, each ridge and groove pair forming a spiral around a longitudinal axis of the anchor. The anchor member can be withdrawn axially through rotation. Alternatively, the anchor member can be withdrawn through linear movement.

BRIEF DESCRIPTION OF THE DRAWINGS

Various embodiments of the present disclosure will be further described, by way of non-limiting example only, with reference to the accompanying drawings.

DETAILED DESCRIPTION

Figure 1:
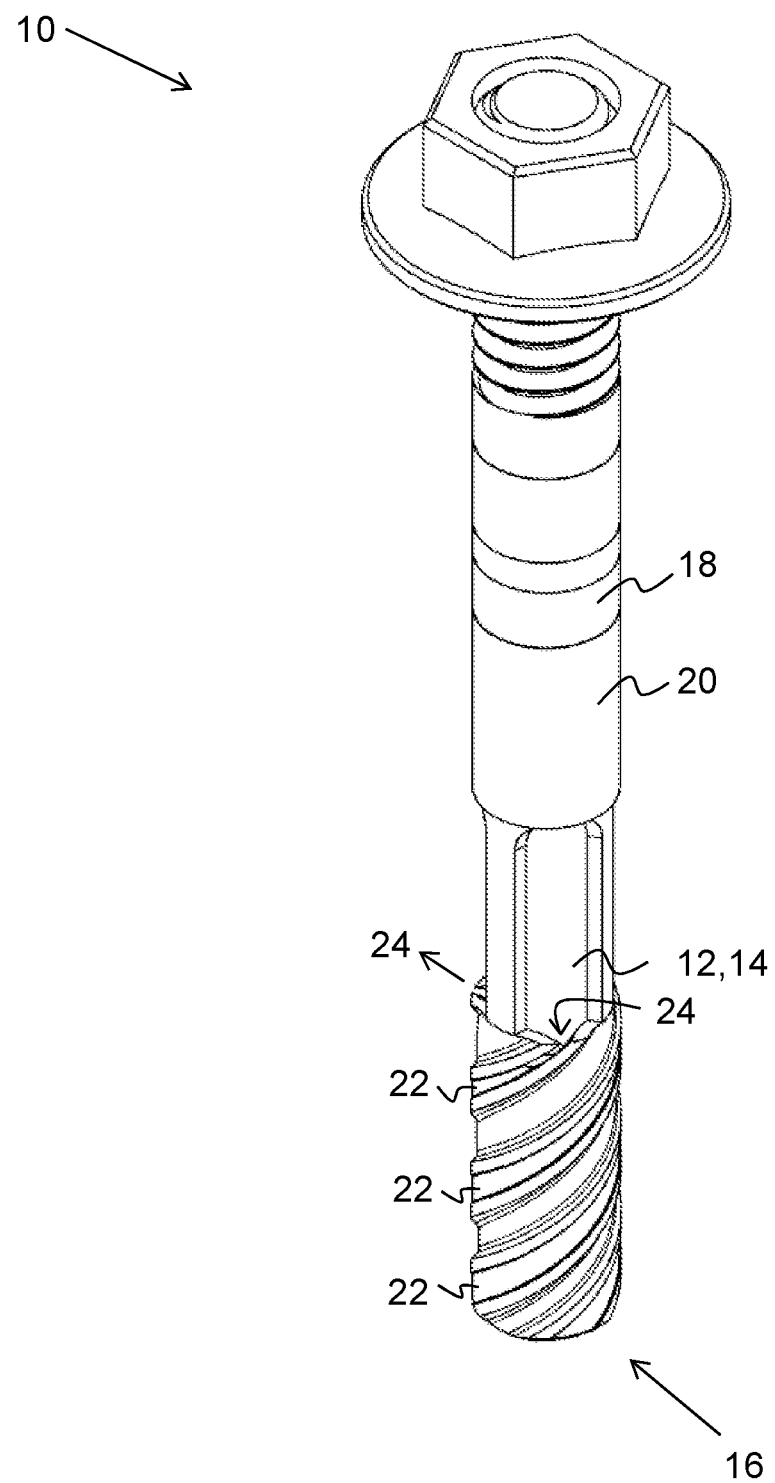
FIG. 1 is an upper perspective view of a masonry anchor of one embodiment of the present disclosure.

With reference to FIG. 1, there is shown a masonry anchor 10 according to one embodiment of the present disclosure. The masonry anchor 10 is of the expansion type and configured for securement in a hole formed in a masonry material, such as concrete.

The masonry anchor 10 comprises an anchor member 12 having an elongate shank 14, a distal end 16, and a head 18. The masonry anchor 10 also comprises a sleeve 20.

Figure 4:
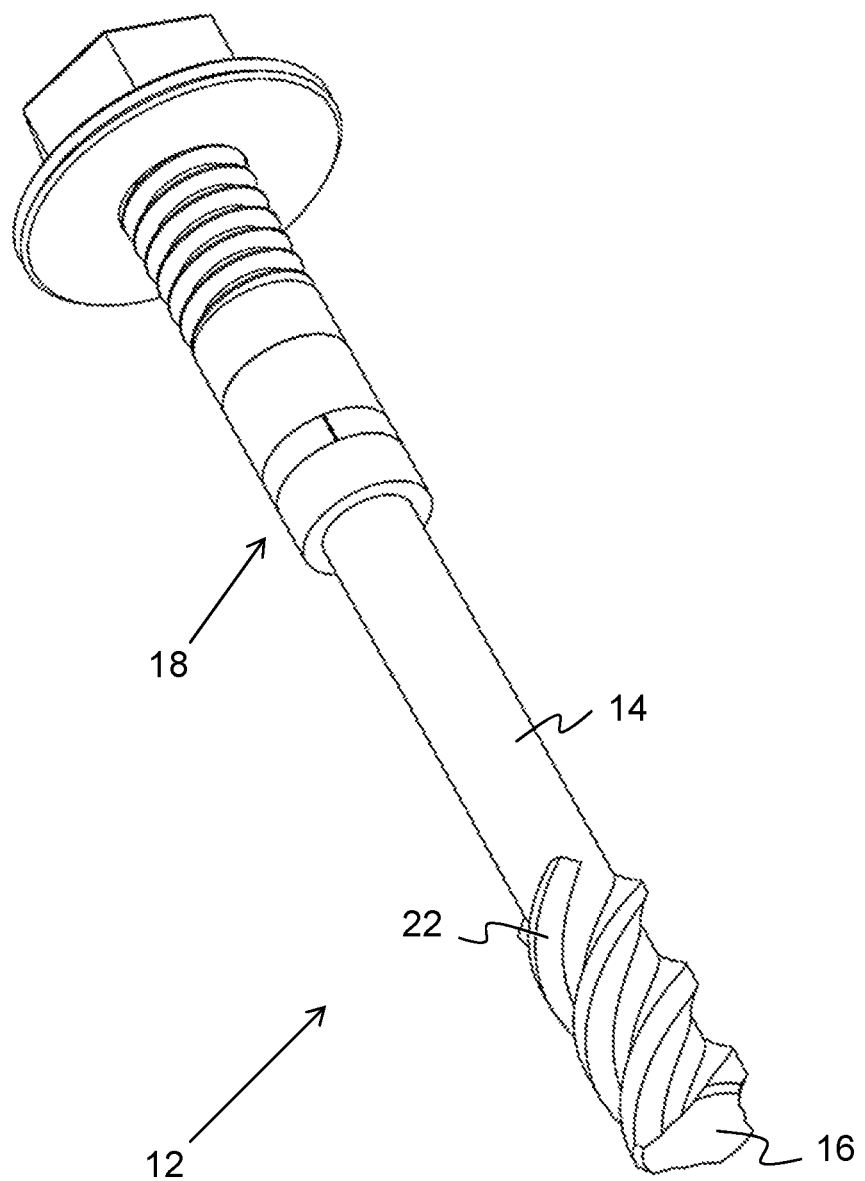
FIG. 4 is a perspective view of an anchor member of the masonry anchor of FIG. 1.

As can best be seen in FIG. 4, the elongate shank 14 of the anchor member 12 has at least one ridge 22 formed thereon. The ridge 22 extends radially outwardly from and along a surface of the shank 14 generally from an end of the anchor member 12 toward a head of the anchor member 12. In the illustrated embodiment, three spiral-shaped, helical ridges 22 which are disposed equidistant around the shank 12 are provided. In other embodiments, one, two, four or more ridges 22 may be provided and the or each ridge 22 may be other than spiral- or helical-shaped. For example, the ridges 22 may be irregular and have curved and straight portions, or combinations thereof. The ridges 22 may also be generally straight and extend along a side of the shank 14 in a plane parallel to a longitudinal axis of the anchor member 12. It will be appreciated that embodiments of the present disclosure having straight ridges may in certain instances be easier to form than those with helical ridges pairs.

Between each ridge 22 is a groove formed in the anchor member 12, with sides of the groove being defined by edges of adjacent ridges 22. Although the cross-sectional width of each ridge reduces toward a head of the anchor member 12, as described in further detail below, the profile height and angle of the side faces of the ridges 22 does not vary. As such, the size of the groove formed in the anchor member 12 widens toward the head of the anchor member 12. Owing to the ridge configuration, in operation an even force distribution between the anchor and a hole can be achieved so that a more even loading along the hole can be achieved, leading to improved retention characteristics.

The ridges 22 are in the form of elongate protrusions or protuberances and illustrated having a profile similar to that of a screw thread with flattened peaks, though it will be appreciated that other profiles may similarly be used. In one example, the ridges 22 may take a profile similar to that used on a lead screw.

Figure 2:
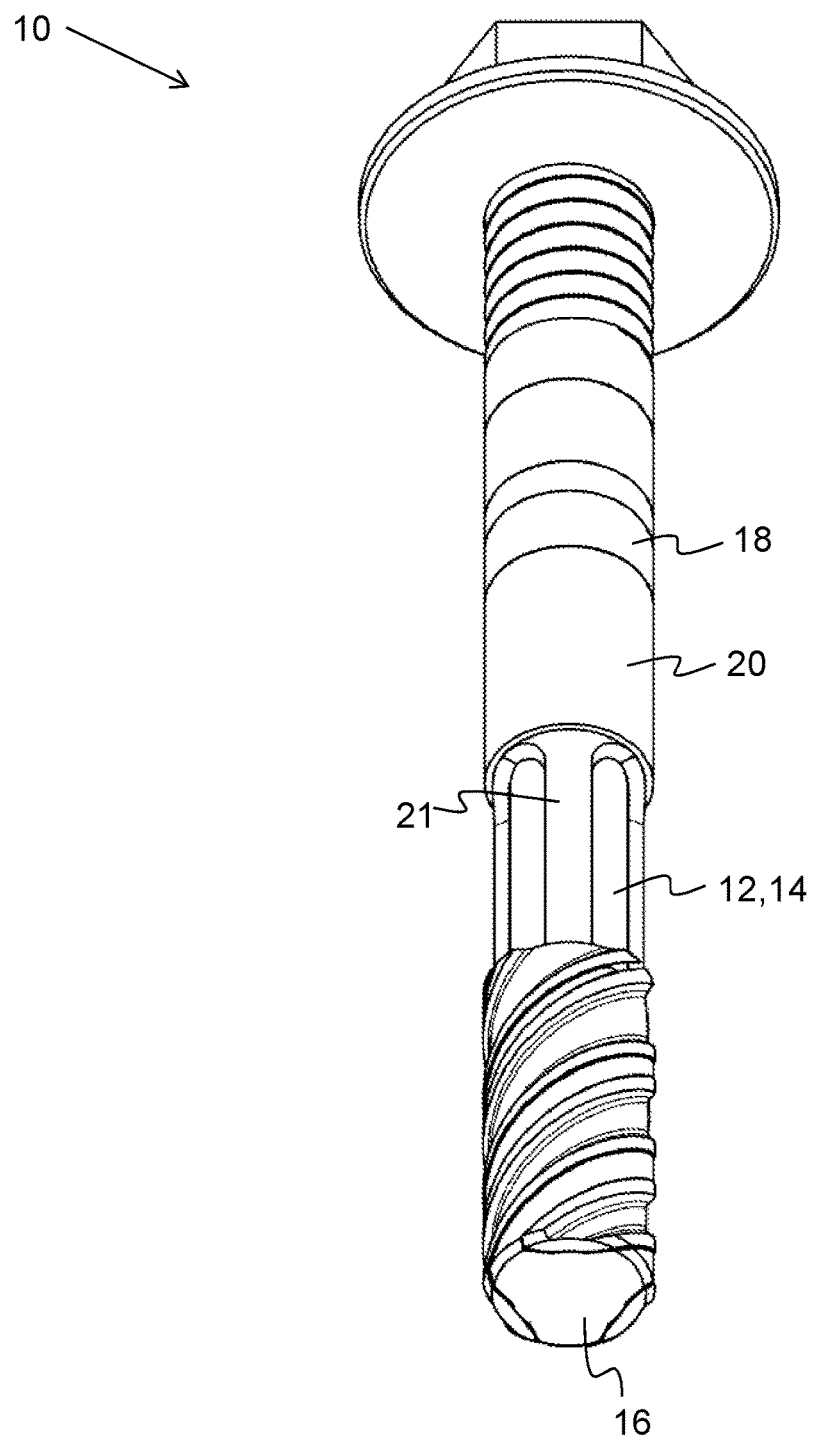
FIG. 2 is a lower perspective view of the masonry anchor of FIG. 1.
Figure 3:
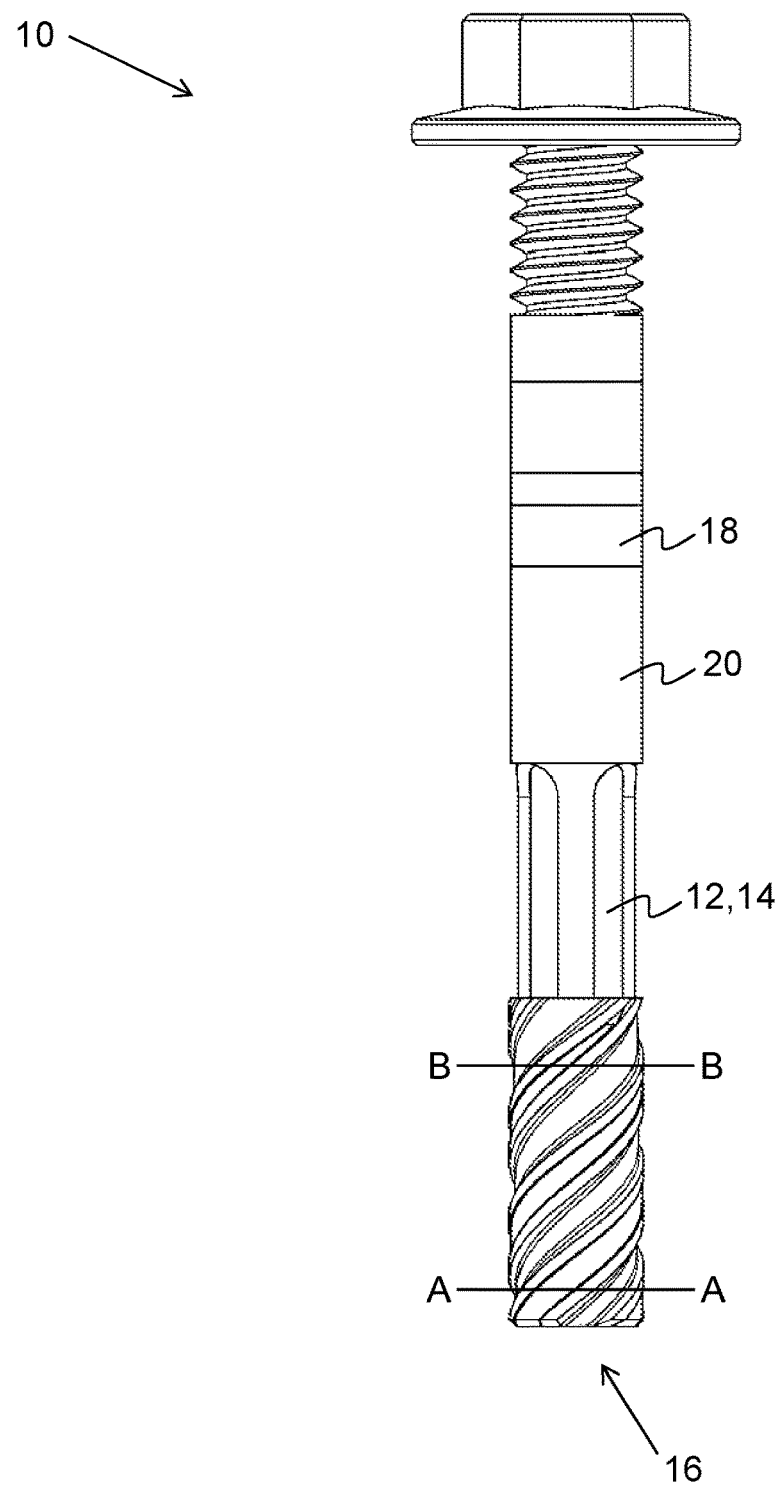
FIG. 3 is a side view of the masonry anchor of FIG. 1.

As can be seen in FIGS. 1 to 3, the masonry anchor 10 also includes a sleeve 20 coaxial with and at least partially surrounding the shank 14 of the anchor member 12. At least a portion of the sleeve 20 is configured to expand radially outwardly for engagement with an internal surface of the hole to secure the masonry anchor 10 within the hole. To enable the sleeve 20 to expand, it is provided with slots though other ways, such as the use of flexible materials, are also envisaged.

Those skilled in the art will appreciate that the term 'sleeve' is used in a functional sense and that the sleeve merely has to at least partially surround the anchor member to provide engagement between the grooves and the corresponding ridges, and may be a sleeve member formed of a number of individual elements. In other embodiments, the sleeve is formed of elongate members, which could be formed of wire for example.

The sleeve 20 has at least one groove 24 formed on an inner surface. The or each groove 24 can extend along a path corresponding to that of the ridges 22. The or each groove 24 is configured for receiving a corresponding ridge 22 of the anchor member 12. Accordingly, in the illustrated embodiment, three spiral shaped grooves 24 that are disposed equidistant around the sleeve 20 are provided. As per ridges 22, in other embodiments, one, two, four, or more grooves 24 may be provided and may also be generally straight and extend along a side of the sleeve 20 in a plane parallel to a longitudinal axis of the anchor member 12.

Figure 5:
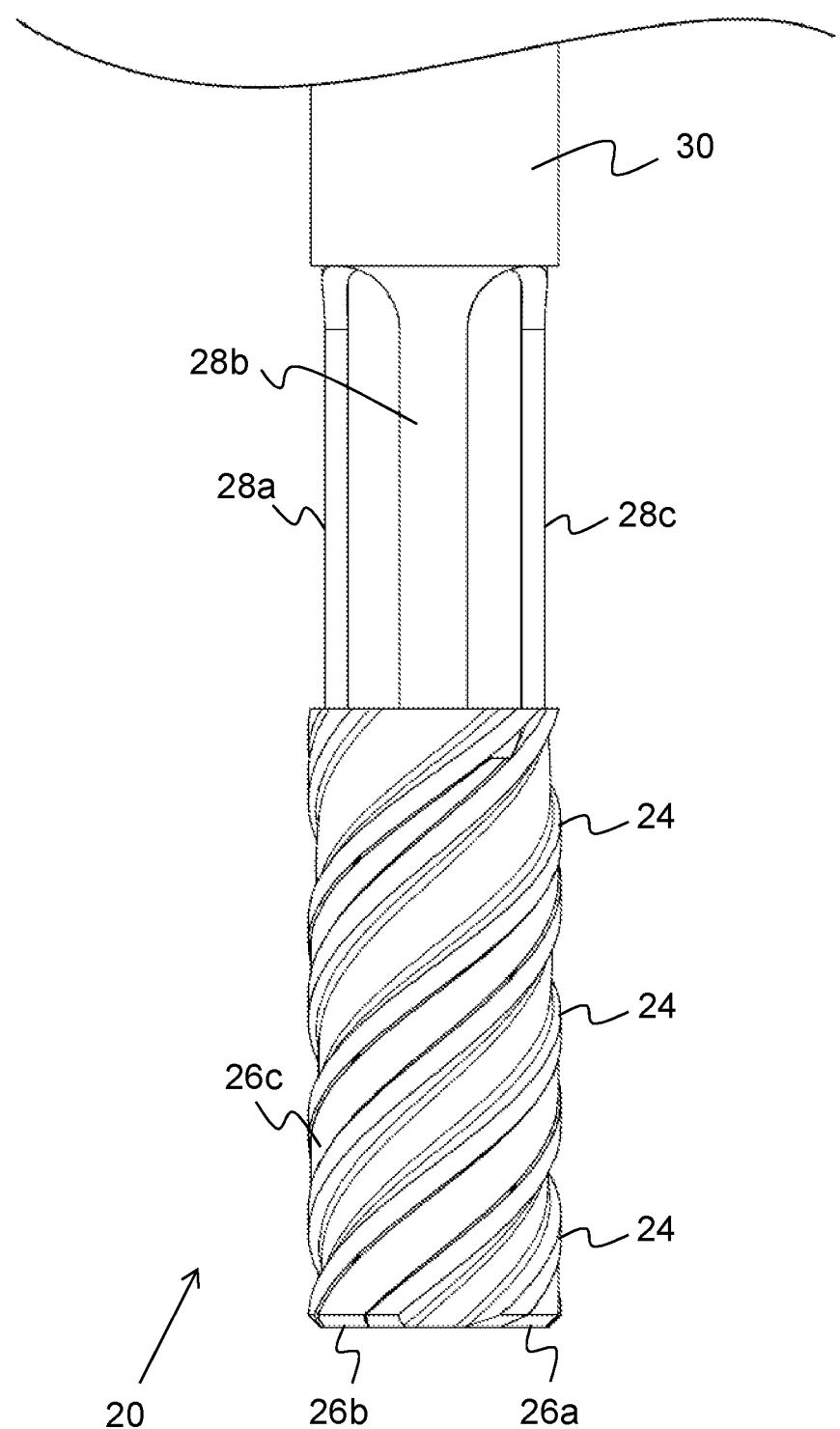
FIG. 5 is a side view of a sleeve of the masonry anchor of FIG. 1.

In the embodiment illustrated in FIG. 5, three grooves 24 are provided and extend through a wall of the sleeve 20 to an outer surface of the sleeve 20 so as to form three helical fingers 26a, 26b, and 26c. Groove 24 creates a void, which in the present example would be helical, between the fingers and is functionally equivalent to grooves 24. In other embodiments, groove 24 may only extend partially into an internal surface of the sleeve 20.

So as to cause expansion of the sleeve 20 for securement in the hole, a cross-sectional width of the ridges 22 and/or a cross-sectional width of the grooves 24 (or the void between fingers 26) reduces as the ridge/groove extends toward the head 18. During installation, the sleeve 20 is held generally in position on insertion into a hole, either by a user or through friction within the hole and the anchor member 12 withdrawn. Rotation of the sleeve 20 may also be possible to increase engagement with the hole. As the anchor member 12 is withdrawn through the sleeve 20, either by rotation or axial translation, widening portions of the ridges 22 toward the end 16 of the anchor member 12 are brought into engagement with the narrowing grooves 24, thereby causing the sleeve 20 to expand, bringing the sleeve 20 into contact with the hole to secure the anchor 10 within the hole. It will be appreciated that the operation of the anchor 10 is analogous to a ridge, wedge, or 'V' shaped member travelling through a decreasing groove and being forced upwardly.

By expanding the sleeve 20 outwardly, it engages an internal surface of the hole with an increased area of engagement between the anchor 10 and a material in which it is to be set, particularly when compared with existing anchors. This can provide a much greater retention force and an optimal full cone pull-out force.

In one embodiment, both a cross-sectional width of the ridge 22 and a cross-sectional width of the groove 24 reduces toward the head, though it will be appreciated that in some embodiments, only the cross-sectional width of the ridges 22 or the cross-sectional width of the groove 24 may vary.

In certain embodiments in which the grooves 24 extend through a wall of the sleeve 20 to an outer surface of the sleeve so as to form three helical fingers 26, an intersection of each groove 24 and an external surface of the sleeve 20 can form an edge with a profile, such as one having a 'sharp' edge for example, configured for cutting into the concrete as the sleeve 20 or helical fingers 26 expand, thereby providing improved interaction between the anchor 10 and the material in which the anchor is being set. Although a rectangular profile on the fingers 26 is shown, a rounded or semicircular profile may also be used.

FIG. 4 illustrates the anchor member 12 removed from the sleeve 20. It can be seen that the ridges 22 are formed only on a portion of the shank 14 proximal to distal end 16. The anchor 10 provides an increased area of engagement between the anchor 10 and a material in which it is to be set when compared with existing anchors. This is particularly true for embodiments having helical ridges/grooves. It will be appreciated that the length of the ridges 22 may be lengthened or shortened as required, so as to vary the engagement area between the anchor 10 and the material.

In one embodiment, the anchor member 12 is formed from plated steel using conventional forming processes, though it will be appreciated that the anchor member 12 may be formed from any suitable commercially available material.

Figure 13:
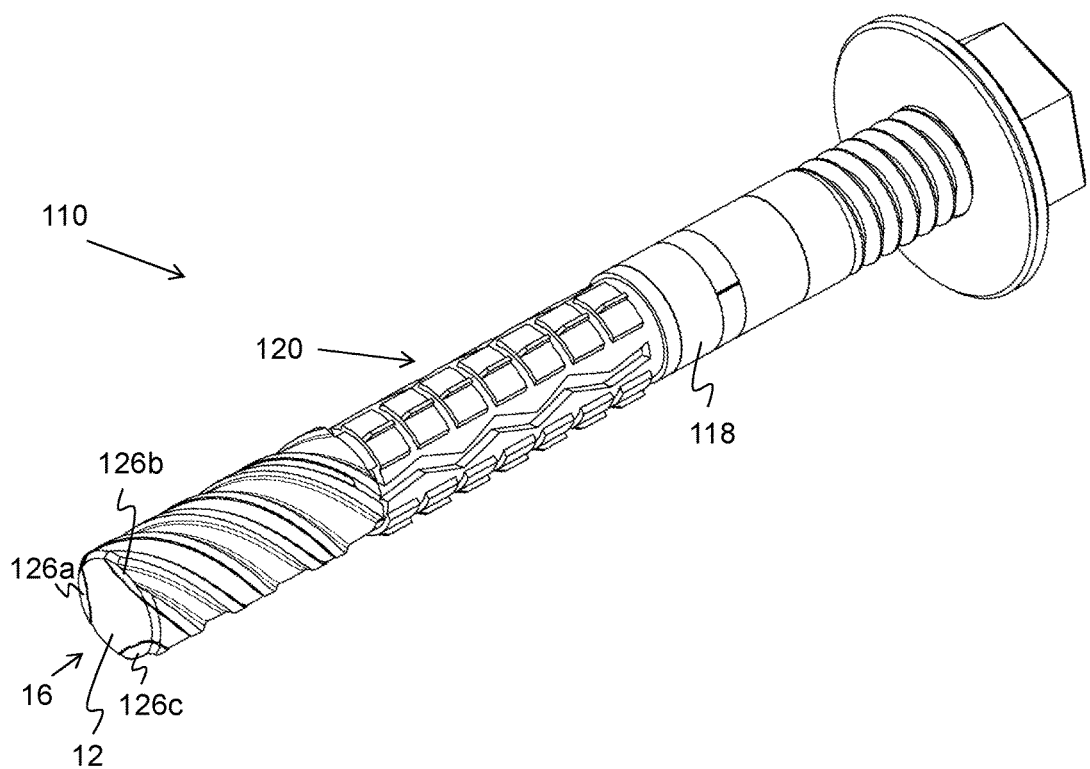
FIG. 13 is a perspective view of a masonry anchor of an alternative embodiment.

FIG. 5 illustrates a close view of sleeve 20. In the embodiment illustrated in FIG. 5, fingers 26a, 26b, and 26c extend from extension members 28a, 28b, and 28c extending from a cylindrical portion 30. Cylindrical portion 30 may be split longitudinally for the purposes of assembly. In some embodiments, such as the anchor 110 shown in FIG. 13, the extension members 128a, 128b, and 128c are configured to extend to a location proximal the termination of the ridges 122 and, in use, configured to extend outwardly to secure the anchor 110 within a void formed in the masonry material, such as in a hollow brick for example.

In one example, sleeve 20 is formed from plated steel, though it will be appreciated that in other embodiments polymer materials may also be used and that any suitable commercially available material may also be used. In some embodiments, the sleeve is configured to be cast into wet concrete and the anchor member 12 installed separately.

Figure 6:
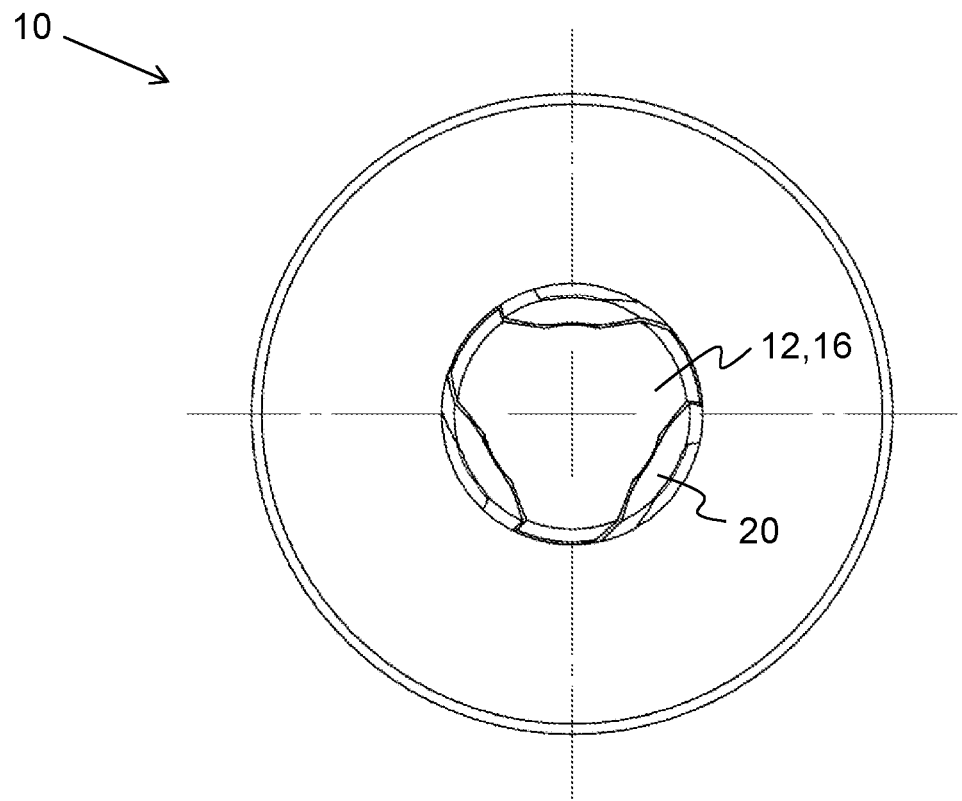
FIG. 6 is an end view of the masonry anchor of FIG. 1.
Figure 7:
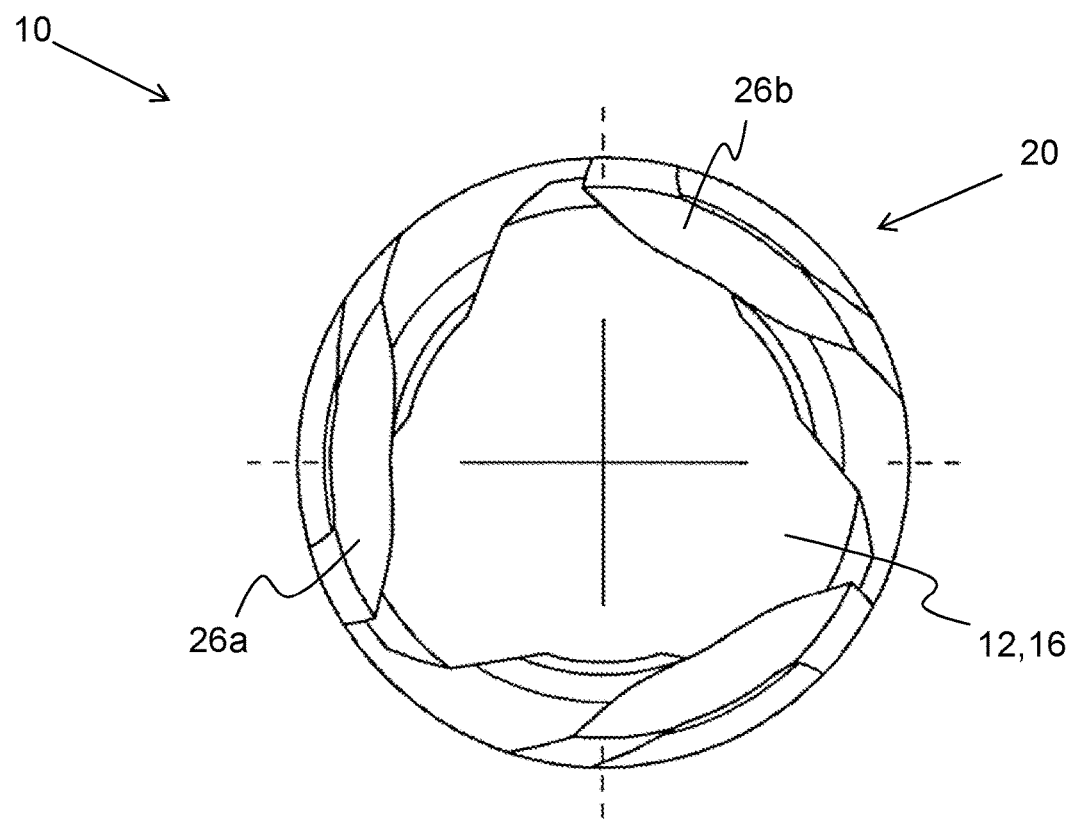
FIG. 7 is a partial close end view of the masonry anchor of FIG. 1 showing the sleeve in a partially expanded state.

FIGS. 6 and 7 illustrate progressive operation of the anchor 10. FIG. 6 is an end view of the anchor 10 in a rest condition. FIG. 7 shows the anchor member 12 being withdrawn through the sleeve 20 (or the sleeve 20 being advanced over the anchor) to urge the fingers 26a, 26b, and 26c radially outwardly.

FIGS. 8 and 9 and 10 and 11 illustrate different sections of the anchor 10 and the variation in the ridges 22 and grooves 24 in two different conditions of use. In the distal section of FIG. 8, it can be seen that ridges 22 and grooves 24 are relatively wide, particularly when compared with the more distal section of FIG. 9, which shows the ridges 22 and grooves 24 as being more narrow.

Figure 8:
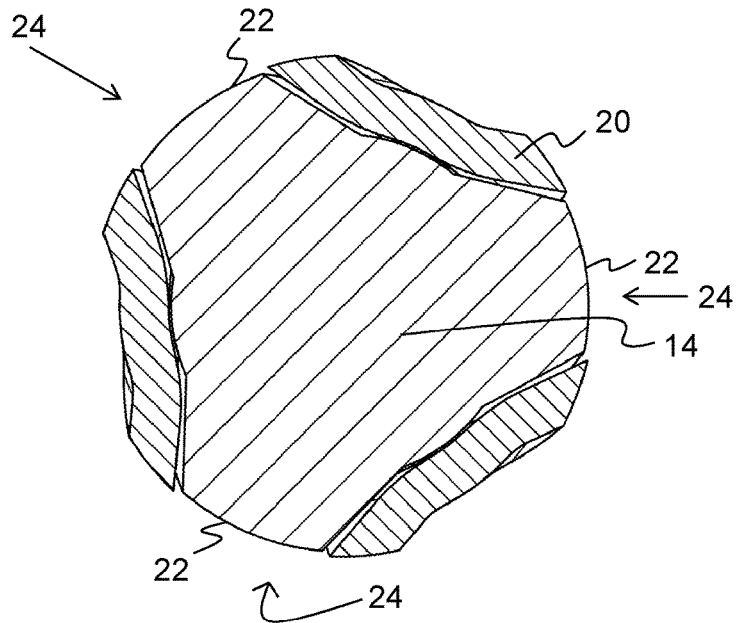
FIGS. 8 and 9 are sectional views of the masonry anchor of FIG. 1 in one condition of use.
Figure 9:
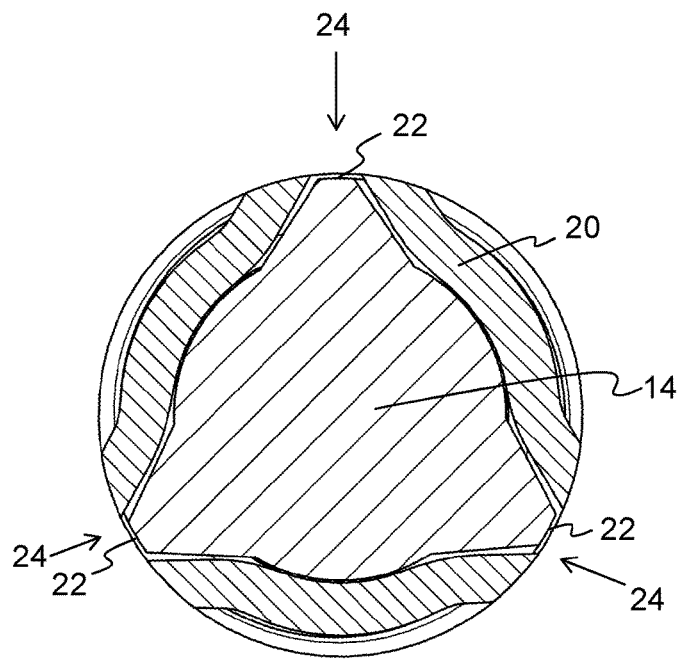
Figure 10:
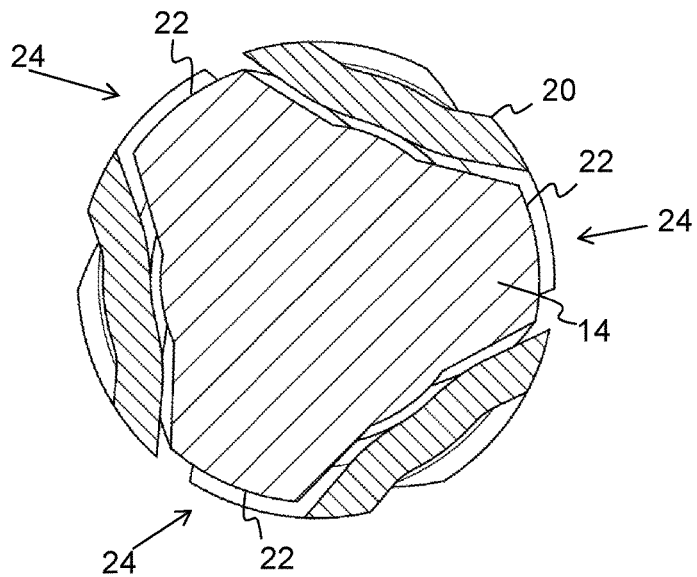
FIGS. 10 and 11 are sectional views of the masonry anchor of FIG. 1 in another condition of use.
Figure 11:
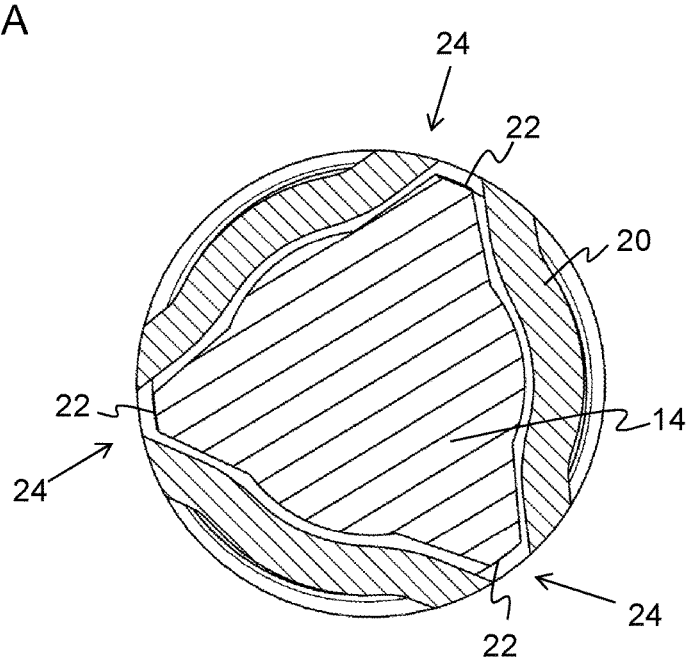
Figure 12:
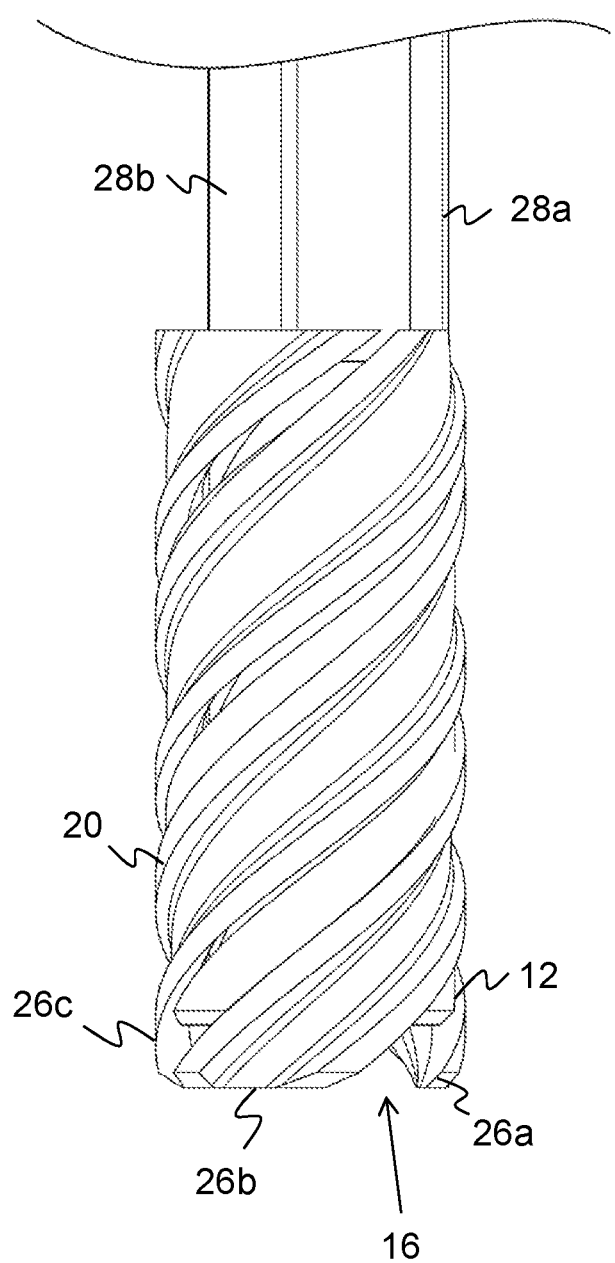
FIG. 12 is a close side view of the sleeve of the masonry anchor of FIG. 1 in a partially expanded state.

FIGS. 10 and 11 correspond to FIGS. 8 and 9 respectively, though with the anchor member 12 being partially withdrawn through the sleeve 20 (or the sleeve 20 being advanced over the anchor) to urge the fingers 26a, 26b, 26c radially outwardly for securing the sleeve 20 within the hole. In this regard, a space can be seen between the anchor member 12 and the sleeve 20.

In alternative embodiments, intermediate components may be provided between the shank 14 and the sleeve 20 to take advantage of leverage and increase the retention force of the anchor within a hole. Such a component may be formed with camming surfaces to amplify torque applied to the anchor to increase the retention force within the hole.

Figure 14:
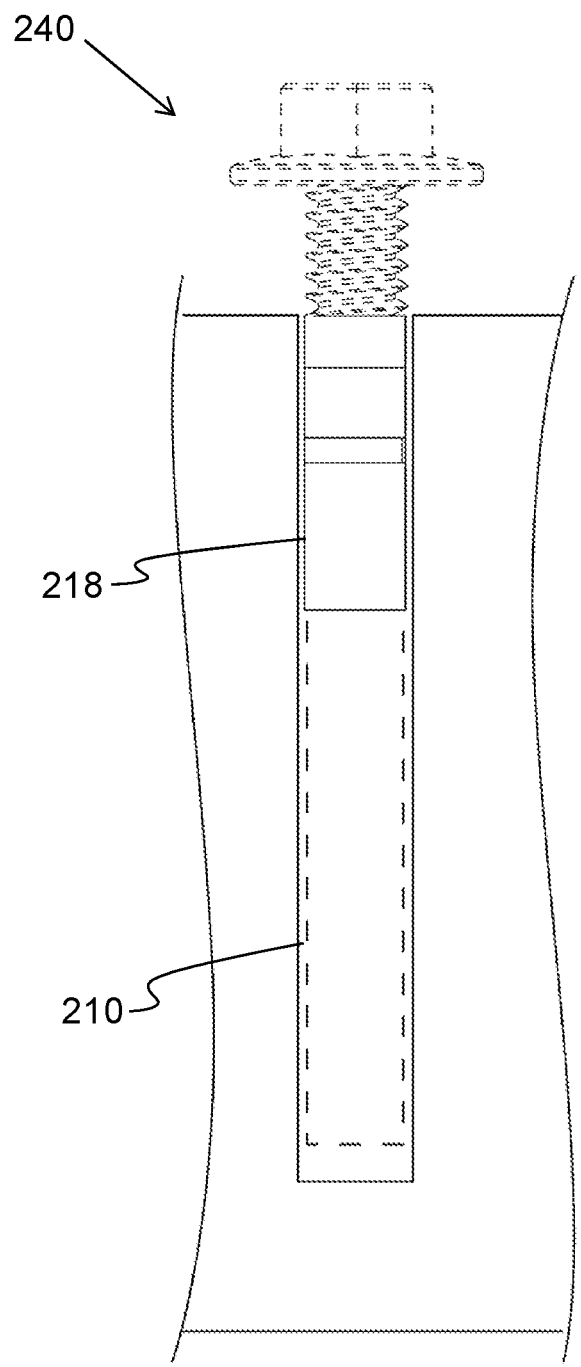
FIG. 14 is a side partial sectional view of a masonry anchor of another alternative embodiment.
Figure 15:
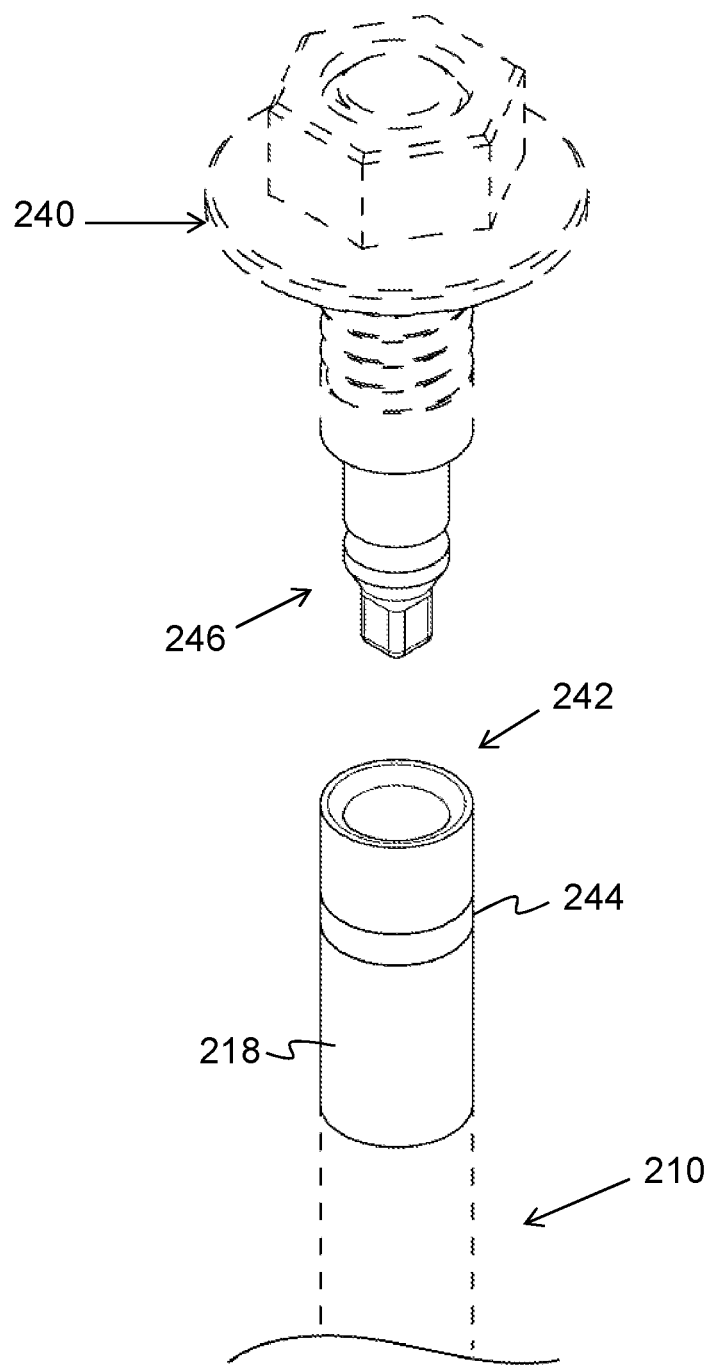
FIG. 15 is a perspective end view of the masonry anchor of FIG. 14.

FIGS. 14 and 15 illustrate an embodiment of the anchor 210 in which the head 218 is configured to receive a fastener 240 for fixing an item to the surface in which the hole is formed. In this regard, the head 218 is formed with a socket 242 in which the fastener 240 can be received. The head 218 can be configured for releasable engagement with the fastener 242.

In this regard socket 242 is configured to releasably receive a mounting portion 246 of a correspondingly shaped mounting fastener 240.

Figure 16:
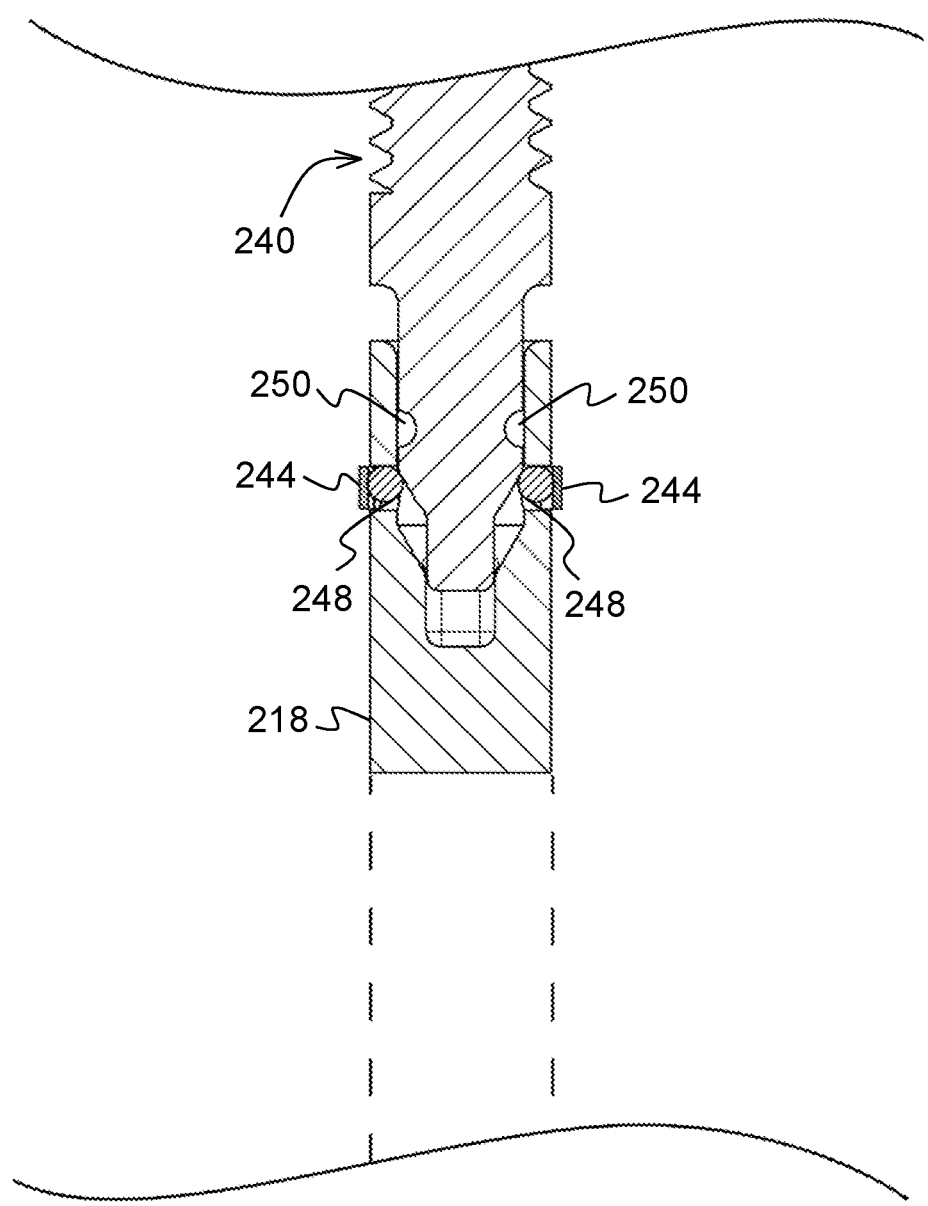
FIG. 16 is a sectional side view of the masonry anchor of FIG. 14 with a mounting fastener partially received therein.
Figure 17:
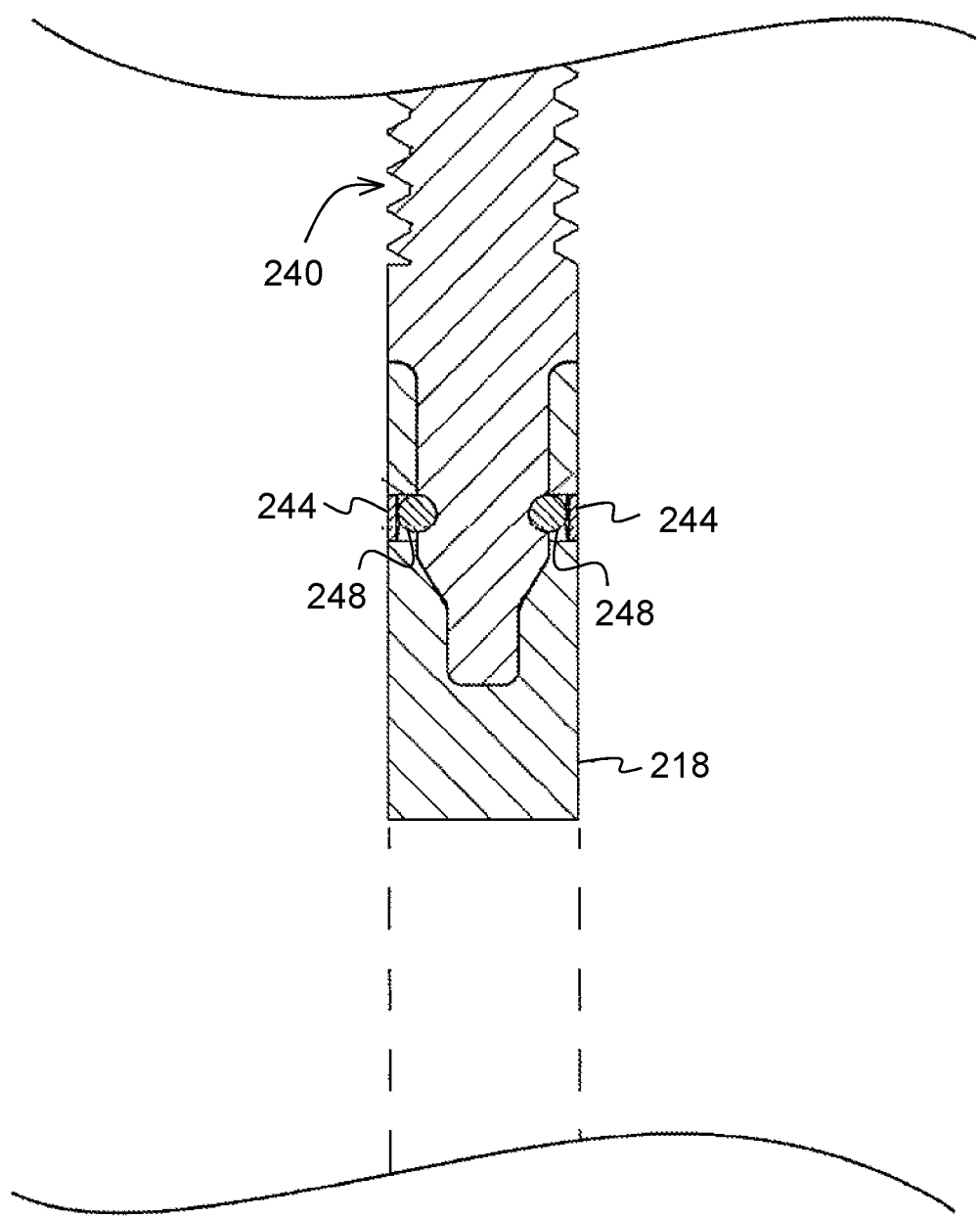
FIG. 17 is a sectional side view of the masonry anchor of FIG. 14 with a mounting fastener fully received therein.

As illustrated in FIGS. 16 and 17, the socket 242 includes resiliently displaceable locking formations 248 configured to be received against the mounting portion 246. In the illustrated embodiment, the locking formations 248 are generally semispherical and extend partially into a void of the socket 242 to be received in a recess 250 formed in the mounting portion 246. Although illustrated as being semispherical, it will be appreciated that the locking formations 248 may take other forms, such as rectangular for example. It will also be appreciated that recess 250 may also take other forms, such as a continuous groove for example.

The locking formations 248 are urged radially inwardly for securing the anchor 210 and the mounting fastener 240 together. In the illustrated embodiment, the locking formations 248 are integrally formed with a resilient band 244 extending around the anchor 210. The resilient band 244 may be a continuous band or may be formed with a longitudinal split to facilitate assembly.

FIG. 16 illustrates the masonry anchor 210 with a mounting fastener 240 partially installed. It can be seen that the locking formations 248 are urged outwardly due to a tapered leading edge of the mounting fastener 240. As the mounting fastener 240 is advanced further into the socket 242, as illustrated in FIG. 17, the locking formations 248 are released and move radially inwardly so as to be received in recess 250, thereby locking the mounting fastener 240 to the anchor 10.

The masonry anchor 10 provides a snap lock fitting for a mounting fastener 240 so that a mounting fastener 240 may be quickly and easily installed. In other embodiments, a release mechanism may be provided, though it will be appreciated that the release mechanism may only be operable under considerable force, which may be destructive of a portion of the mounting fastener 240. In one example, the locking formations 248 can be urged radially outwardly to release the mounting fastener 240. In such embodiments, provision may be made for a screw driver to be inserted into the socket 242 or the mounting fastener 240 to release the band 244. In other example, the locking formations 248 or the band 244 may be deformable.

As illustrated in FIG. 15, the mounting portion 246 is formed with a non-circular profile, which is configured to be received by a correspondingly shaped portion of the socket 242 to transmit torque from the mounting fastener 240 to the anchor 210. In various embodiments, the non-circular profile is rectangular, and square in the illustrated embodiment.

The described and illustrated masonry anchor 210 provides a connection system in which a series of mounting fasteners 240, which may be interchangeable, to be used in connection with a masonry anchor. This simplifies manufacturing, distribution and retailing. Although the masonry anchor 210 may be installed in an existing masonry material, it may also be cast in the material at predetermined locations, thereby providing a socket in which a number of different mounting fasteners can be fitted. In embodiments to be cast in place, the masonry anchor may be installed with a protective cap to prevent material entering the socket 242.

In one form, the system is configured for installing a mounting fastener in a masonry panel and comprises a socket to be embedded in the panel which is accessible after installation. The socket is configured to releasably receive a mounting portion of a correspondingly shaped mounting fastener and the socket includes resiliently displaceable locking formations configured to be received against the mounting portion to secure the mounting fastener to the panel.

Figure 18:
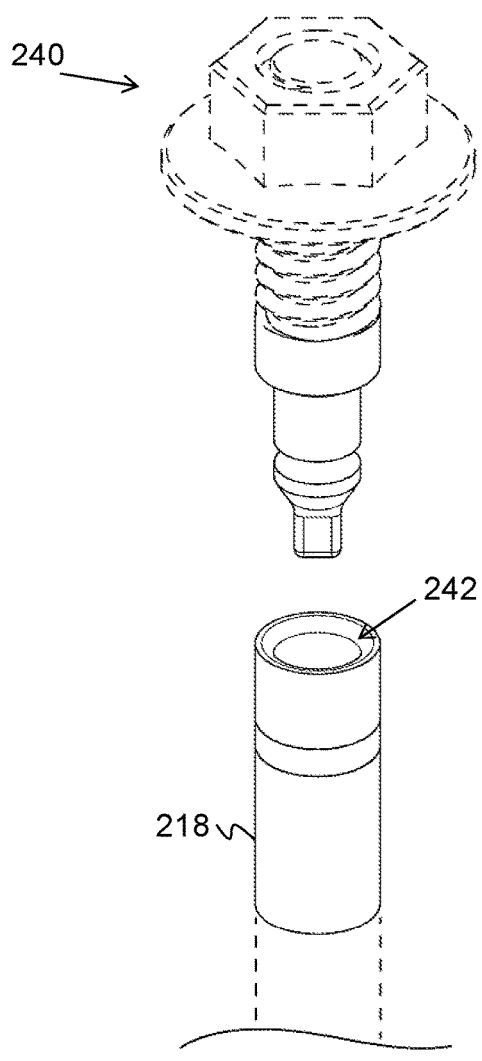
FIGS. 18 and 19 are perspective end views of the masonry anchor of FIG. 14 with different mounting fasteners.
Figure 19:
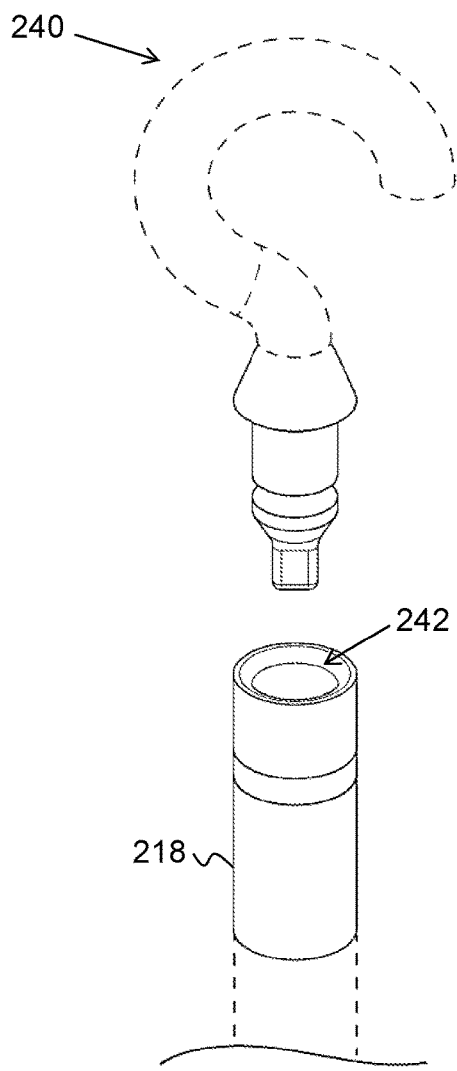

Those skilled in the art will appreciate that many differently configured mounting fasteners may be used with the masonry anchor 210, such as for example, a screw thread or a bar, or a hook, as illustrated in FIGS. 18 and 19.

Another embodiment provides a method of securing an masonry anchor in a hole, including the steps of:
providing an anchor member having an elongate shank with at least one ridge formed thereon, the ridge extending radially outwardly from and along a surface of the shank generally from an end of the anchor toward a head of the anchor;
providing a sleeve configured to be coaxial with and at least partially surround a shank of the anchor and configured to expand radially for securing the anchor in a hole, the sleeve having at least one groove formed in an internal surface thereof and configured for receiving a corresponding ridge of the shank, wherein a cross-sectional width of the ridge and/or a cross-sectional width of the groove reduces as the ridge/groove extends toward the head so that as the shank is withdrawn through the sleeve, the sleeve expands; and
withdrawing the anchor member while maintaining the sleeve substantially in position to lock the anchor within the hole.

In the illustrated embodiments, the masonry anchor has three ridge and groove pairs, each ridge and groove pair forming a spiral around a longitudinal axis of the anchor. The anchor member may be withdrawn axially through rotation, or alternatively, the anchor member may be removed with linear translation.

The embodiments have been described by way of example only and modifications are possible within the scope of the present disclosure disclosed.

The invention claimed is:

1. A masonry anchor comprising:
an anchor member having a shank and a ridge formed on the shank, the ridge extending radially outwardly from and along a surface of the shank generally from a distal end of the anchor member toward a head of the anchor member; and
a sleeve defining a groove, wherein the sleeve is coaxial with and at least partially surrounds the anchor member such that the ridge of the shank is at least partially received in the groove,
wherein a cross-sectional width of at least one of the ridge and the groove reduces in a direction extending toward the head of the anchor member so withdrawal of the anchor member through the sleeve expands at least part of the sleeve radially outwardly.

2. The masonry anchor of claim 1, wherein the cross-sectional width of the ridge and the cross-sectional width of the groove each reduce in a direction extending toward the head of the anchor member.

3. The masonry anchor of claim 1, wherein the groove extends from an inner surface of the sleeve through an outer surface of the sleeve.

4. The masonry anchor of claim 3, wherein an intersection of the groove and the outer surface of the sleeve forms an edge with one of: a cutting profile and a compressing profile.

5. The masonry anchor of claim 1, wherein the anchor member further comprises multiple ridges and the sleeve further defines multiple grooves, wherein the multiple ridges are respectively at least partially received in the multiple grooves.

6. The masonry anchor of claim 1, wherein the ridge wraps at least partially around the shank.

7. A masonry anchor comprising:
an anchor member having a shank and multiple helical ridges formed on the shank, wherein each of the ridges extends radially outwardly from and along a surface of the shank generally from a distal end of the anchor member toward a head of the anchor member, wherein each of multiple pairs of adjacent ridges forms a space therebetween; and
a sleeve including multiple helical fingers, wherein each of multiple pairs of adjacent fingers forms a helical void therebetween, wherein the sleeve is coaxial with and at least partially surrounds the anchor member such that each finger is at least partially received in a different one of the spaces and each ridge is at least partially received in a different one of the voids,
wherein cross-sectional widths of the ridges and cross-sectional widths of the voids each reduce in a direction extending toward the head of the anchor member so withdrawal of the anchor member through the sleeve expands at least part of the sleeve radially outwardly.

8. The masonry anchor of claim 7, wherein the head of the anchor member is sized and shaped to receive a fastener.

9. The masonry anchor of claim 8, wherein the head of the anchor member defines a socket in which the fastener is receivable, the head configured to releasably engage the fastener.

\* \* \* \* \*